US006263399B1

United States Patent
Hwang

(10) Patent No.: US 6,263,399 B1
(45) Date of Patent: Jul. 17, 2001

(54) MICROPROCESSOR TO NAND FLASH INTERFACE

(75) Inventor: David S. Hwang, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/089,626

(22) Filed: Jun. 1, 1998

(51) Int. Cl.[7] .................................................. G06F 12/16
(52) U.S. Cl. ............................ 711/103; 711/2; 711/4; 711/5; 711/102; 711/104; 711/105
(58) Field of Search ....................... 711/1–5, 102–105

(56) References Cited

U.S. PATENT DOCUMENTS 5,603,001 * 2/1997 Sukegawa et al. .................. 711/103
5,812,814 * 9/1998 Sukegawa .......................... 711/103

* cited by examiner

Primary Examiner—Than Nguyen
(74) Attorney, Agent, or Firm—Sierra Patent Group, Ltd.

(57) ABSTRACT

A data processing apparatus is described which comprises a microprocessor having data lines, address lines and control lines, a memory interface having input control lines, input address lines, output control lines, and output I/O lines wherein one or more input address lines of the memory interface are coupled to an equal number of address lines of the microprocessor. Further, a memory having control lines and I/O lines is provided, the control lines of the memory being coupled to output control lines of the memory interface, and I/O lines of the memory being coupled to output I/O lines of the memory interface. The memory receives command, data and address information through the I/O lines.

19 Claims, 5 Drawing Sheets

MICROPROCESSOR TO NAND FLASH INTERFACE

BACKGROUND OF THE INVENTION

1. Field of the Invention

The present invention relates to an apparatus for interfacing memory to a microprocessor. More particularly, the invention relates to an apparatus for interfacing NAND Flash memory to a microprocessor.

2. The Background Art

Most microprocessors, called Central Processing Units (CPU's), have a memory interface that they use to access conventional non-volatile memory e.g. ROM, Flash memory. Depending on the tasks the CPU is required to perform, the data stored in this non-volatile memory may include instructions to allocate RAM memory for system functions, or cause other system components to be put into a known state so that the all system components may be synchronized. If the system containing the CPU is designed to operate without external storage such as a hard drive or CDROM, the non-volatile memory may include operating system or application software. The size of the required non-volatile memory for any given system may range from a few kilobytes to several megabytes or larger, depending on the requirements of the particular system.

FIG. 1 depicts a prior art data processing apparatus.

Referring to FIG. 1, CPU 10 interfaces with memory 12 using chip select line 14, output enable line 16, read/write line 18, address lines 20, and data lines 22. Chip select line 14, output enable line 16, and read/write line 18 may be grouped and classified as control lines, since they perform various control functions to ensure that the memory and the microprocessor are simultaneously ready for data transfers into or out of memory.

Some types of memory 12 have a single read/write line 18 which might be raised to a high logic level when a read operation is intended and held at a low when a write operation is intended. Other memories having a single read/write line may require a logical high be asserted when writing and a logical low be asserted when reading. A third type of memory might have two lines, a read enable line which is raised to a logical high when a read operation is intended, and a write enable line which is raised to a logical high when a write operation is intended. Read/write line 18 is intended to represent situations involving either a single read/write line, or involving separate read enable and write enable lines.

When CPU 10 has a need to read information from or write information to memory 12, CPU 10 provides a memory address over address lines 20, sets the proper condition of read/write line 18, and then raises the output enable line 16 high. The data is then transferred between CPU 10 and memory 12 on data lines 22.

Although this prior art apparatus is useful for its intended purposes, it suffers from the drawback that the maximum memory size is permanently fixed when CPU 10 and memory 12 are designed into a circuit. For a given size of memory a local bus having a certain number of address lines is required, with each address line being simultaneously asserted or deasserted, depending on the binary address of the memory cell being accessed. For example, in order to interface to a 16 KByte ROM, CPU 10 and memory 12 must have fifteen address lines. Once that design is fixed with a particular number of required address lines, there can be no increase in the amount of memory used in the particular design. In our example where the design was finalized as having a 16 Kbyte ROM memory, there would be fifteen address lines leading from the CPU to that ROM memory. If a later need arises for a larger ROM size, costly redesign must take place to add the required additional address lines to the local bus.

It would therefore be beneficial to provide a CPU-memory combination which allows for expansion of memory without having to redesign the surrounding circuitry.

Another drawback of the prior art system is the cost of the available memory. In common use today is conventional flash memory. The present invention provides an apparatus which, in a preferred embodiment, uses NAND flash memory which provides a six-fold cost improvement over prior art conventional memory.

BRIEF DESCRIPTION OF THE INVENTION

A data processing apparatus is described which comprises a microprocessor having data lines, address lines and control lines, a memory interface having input control lines, input address lines, output control lines, and output I/O lines wherein one or more input address lines of the memory interface are coupled to an equal number of address lines of the microprocessor. Further, a memory having control lines and I/O lines is provided, the control lines of the memory being coupled to output control lines of the memory interface, and I/O lines of the memory being coupled to output I/O lines of the memory interface. The memory receives command, data and address information through the I/O lines.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

The heart of this invention is the interfacing of a NAND flash or other similar memory with a conventional CPU through a memory interface. An optional conventional ROM memory may also be coupled to the memory interface, through control lines, address lines, and data lines provided for that purpose.

Here, a conventional CPU is one which has separate address and data lines, and which addresses randomly accessible memory segments, typically one to four bytes at a time, and which typically requires that all bits of a complete address for a given memory segment be presented simultaneously on the CPU address lines.

A NAND flash memory is a page-oriented memory which is read from and written to using sequential data byte blocks.

Further, a NAND Flash memory receives command, data, and address information on the same I/O lines. In order for a conventional CPU to effectively communicate with a NAND flash memory or other similar memory, it is necessary for an interfacing apparatus to translate the address information received from the CPU into a form usable by the NAND flash memory, and to reorganize byte-level data at the CPU into page or block form. Further, the memory interface properly operates the NAND flash memory control lines, a task which would be impossible for conventional CPU's without external circuitry.

For the purposes of this disclosure, the phrase "data processing system" refers to the combination of a conventional CPU and conventional nonvolatile memory e.g. EEPROM, flash memory. Further, identical reference designations used in more than one figure are intended to refer to the same item.

In this disclosure a local bus having control, address and data lines may have one or more line "asserted". It is intended within this specification that "asserting" a line means that the line is brought to an enabled state, whether that state is a logical high or a logical low as defined for a given device. To deassert a line will be understood to mean that the line is brought to an disabled state, whether that disabled state is a logical high or a logical low.

Figure 2:
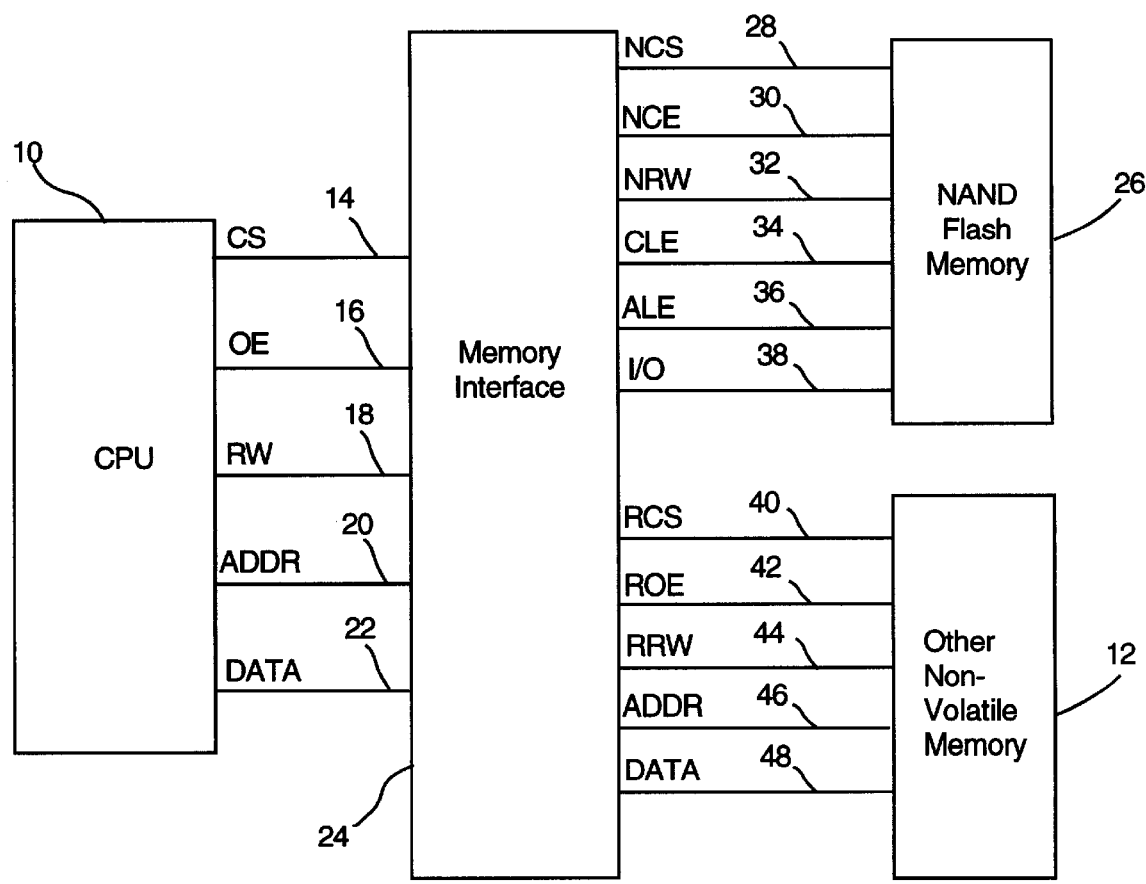
FIG. 2 is a schematic diagram of a data processing system according to a presently preferred embodiment of the present invention.

FIG. 2 is a schematic diagram of a data processing system according to a presently preferred embodiment of the present invention.

Referring to FIG. 2, CPU 10 interfaces with memory interface 24 using chip select line 14, output enable line 16, read/write line 18, address lines 20, and data lines 22. As in the prior art, chip select line 14, output enable line 16, and read/write line 18 may be grouped and classified as control lines, since they perform various control functions.

Memory interface 24 interfaces with NAND flash memory 26 using NAND chip select (NCS) line 28, NAND chip enable (NCE) line 30, and NAND read/write line (NRW) 32, command latch enable (CLE) line 34, address latch enable (ALE) line 36, and I/O lines 38. I/O lines 38 are used by NAND flash memory 26 to receive command, data, and address input from CPU 10. NRW line 32 is intended to represent situations involving either a single read/write line, or involving separate read enable and write enable lines. NCS line 28, NCE line 30, NRW line 32, CLE line 34, and ALE line 36 may be grouped into a category termed control lines. When the phrase "control lines" is used in this disclosure, it is meant to refer to one or more lines, other than address and data lines that may be needed to be asserted in order for an electrical component to operate properly, regardless of whether those lines are specifically called out in this disclosure. Persons of ordinary skill in the art are aware of the operational requirements which must be satisfied in order to ensure that any given memory operates properly.

Memory interface 24 interfaces with memory 12 using ROM chip select (RCS) line 40, ROM output enable (ROE) line 42, ROM read/write line (RRW) 44, address lines 46, and data lines 48. Although it is necessary that memory 26 be present, memory 12 is optional and may not be present in some systems.

In a presently preferred embodiment, CPU 10 comprises a μSparcII-ep processor (available from Sun Microsystems, Palo Alto, Calif.) and NAND Flash Memory 26 comprises NAND Flash Part No. KM29V64000T/R (available from Samsung Electronics, San Jose, Calif., USA). However, those having ordinary skill in the art will readily recognize that the present invention may be practiced using most modern microprocessors and other similar memories, with little or no modification.

It is not necessary that memory 26 be a NAND flash memory. Rather, memory 26 will typically have I/O lines used for address and data, address and command, command and data, or command, data, and address information. Although the preferred memory 26 is a page oriented device, it is not necessary that memory 26 be page oriented. Rather, memory 26 may be constructed to transfer data a single byte or one or more data words (typically two or four bytes long) at a time, rather than a full page (512 bytes) at a time.

As in the prior art, NRW line 32 may be a single line raised high for one operation (read or write) and held low for the alternative operation (read or write), or may instead be two lines, one for read enable, and one for write enable.

One desirable benefit of using a NAND Flash memory in lieu of a conventional flash memory is that different NAND flash memory capacities may be accommodated by a given circuit without the necessity of having to modify the addressing structure. The preferred NAND flash memory has eight I/O lines which receive up to 24 bits of address information in three 8-bit transfers per address cycle. Numbers of I/O lines other than eight, and numbers of transfers other than three may be accommodated without departing from the scope or purpose of the present invention.

Figure 3:
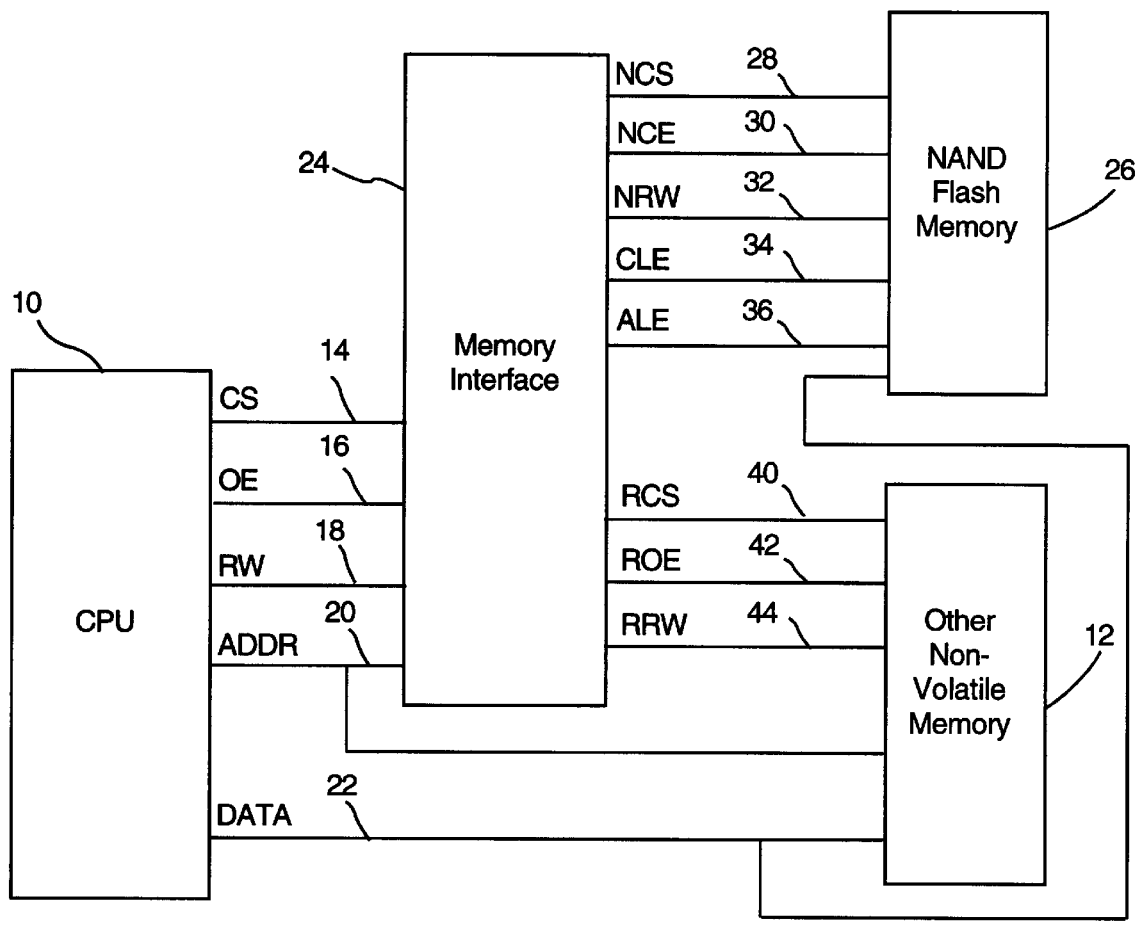
FIG. 3 is a schematic diagram of an alternative embodiment data processing system according to the present invention.

FIG. 3 is a schematic diagram of an alternative embodiment data processing system according to the present invention.

Referring to FIG. 3, an embodiment presented therein is identical to that presented in FIG. 2, except that the address lines 20 and data lines 22 are routed differently. Instead of routing address lines 20 only from CPU 10 to memory interface 24 as in FIG. 2, address lines 20 are routed to both memory interface 24 and memory 12. Instead of routing data through memory interface 24 to NAND flash memory 26 and memory 12 as seen in the embodiment depicted in FIG. 2, data lines 22 in the FIG. 3 embodiment are commonly shared between the three devices. Data lines 22 are coupled to the I/O lines of memory 26, thus making it necessary that CPU 10 provide address, data, and command information to memory 26 over data lines 22.

Figure 4A:
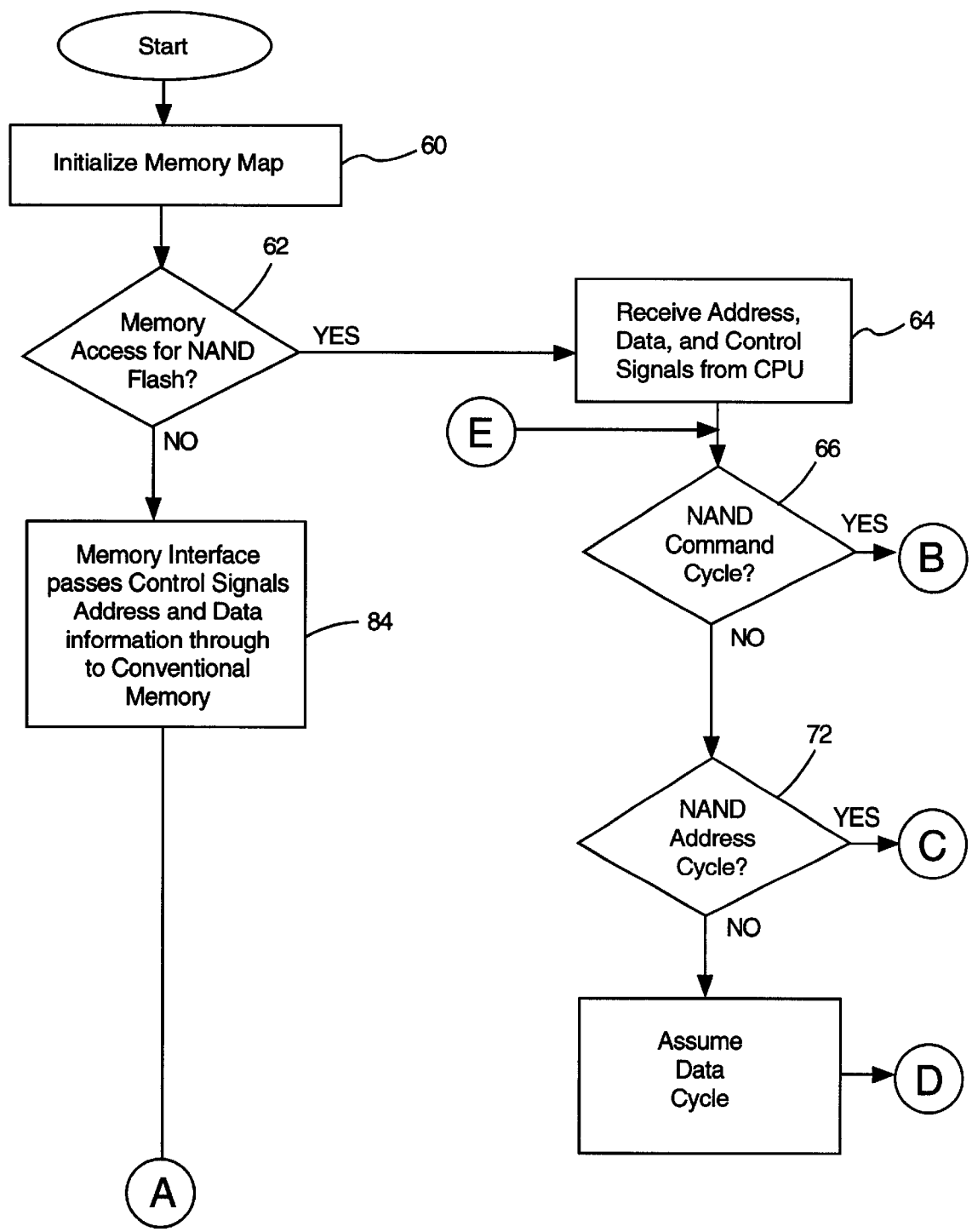
FIGS. 4A and 4B comprise a flow chart showing the steps according to a presently preferred method of the present invention.
Figure 4B:
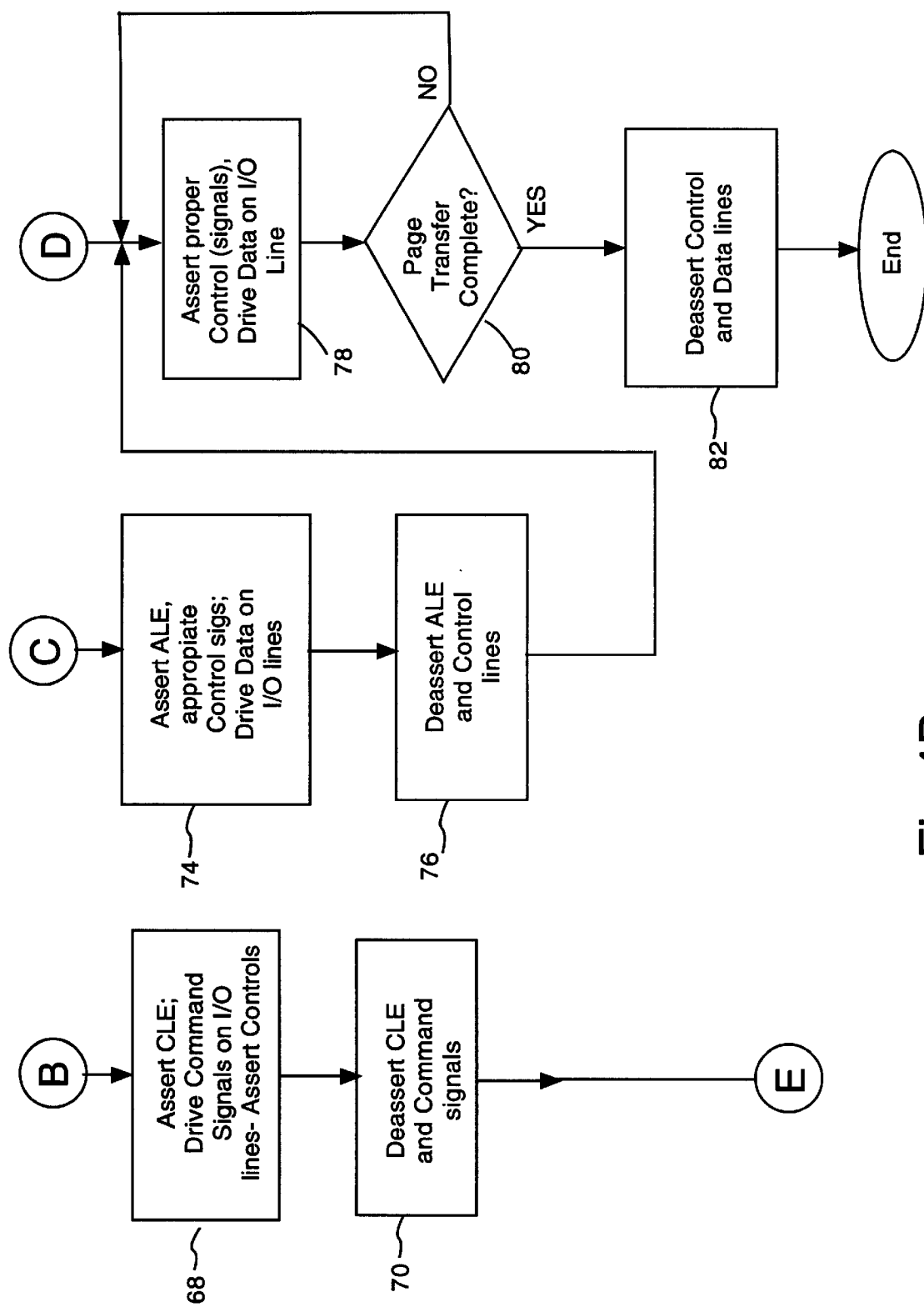

FIGS. 4A and 4B comprise a flow chart showing the steps according to a presently preferred method of the present invention.

Referring to FIG. 4, at step 60, CPU 10 creates a memory map by dividing available memory address space into blocks, and associating particular blocks with particular devices or functions. In the resulting memory map, memory 12 and NAND flash memory 26 will be recognized and allocated. Upper and lower memory addresses will be associated with each memory device.

In order to read or write to memory 26, it is necessary that a command be issued designating the desired operation, an address cycle be performed designating the page of memory involved, and a data cycle be performed in order to read or write the desired data.

At step 62, the CPU performs an instruction requiring the writing or reading of data from either memory 12 or NAND flash memory 26. If the memory involved in the read or write operation is memory 26, the preferred method of the present invention proceeds with step 64 where memory interface 24 receives address, data, and control signals arriving from CPU 10 and determines the activity that the CPU requires to be performed. Possible operations required by CPU 10 may include reading of one or more bytes of memory, writing of one or more bytes of memory, or erasing memory blocks. Receiving memory instructions from the CPU 10 in the manner described, that is, over lines directly connecting CPU 10 and memory interface 24, is called communicating with CPU 10 in its native form; the signals put out by CPU 10 are received directly by memory interface 24 with no changes or translations. Likewise, NAND flash memory 26 communicates with memory interface 24 in its native form.

Figure 1:
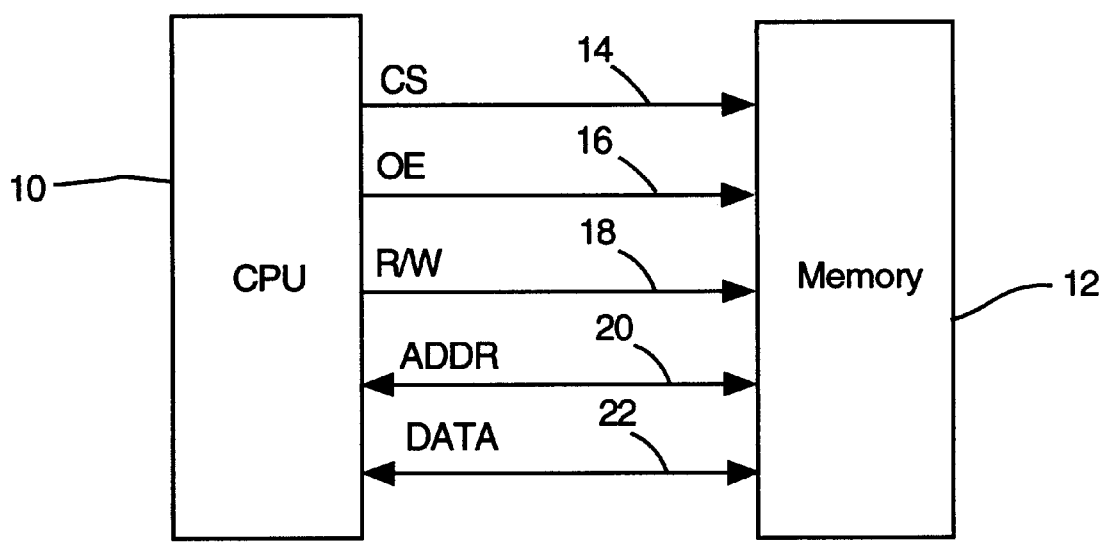
FIG. 1 depicts a prior art data processing apparatus.

An example of one operation that might be required, we will assume that CPU 10 issues a conventional command which, in the prior art system of FIG. 1, would read a byte of data from memory 12. However, the command is issued using the preferred embodiment of FIG. 2, and the address issued pertains to memory 26.

In order to read the byte and send it back to CPU 10, NAND flash memory 26 must cause the page containing the particular byte of data to be read out on I/O lines 38. When the desired byte of data is returned to memory interface 24, that byte of information may be transmitted to the CPU in the same manner as is known by those having ordinary skill in the art. The key to the present invention is that memory interface 24 translates the communication protocol used by the CPU into a form usable by NAND flash memory 26 memory interface 24 communicates with both CPU 10 and NAND flash memory 26 in their native forms.

At step 66 of FIG. 4A, memory interface 24 determines if a command needs to be issued, thus requiring a command cycle to be performed. In a presently preferred method, commands that might need to be issued at any given time in a command cycle include read, write, and erase.

If, at step 66, a command cycle was determined to be required, step 68 proceeds with the transmission of the required command to memory 26 when memory interface 24 asserts CLE line 34, the appropriate ones of I/O lines 38 representing the desired command, and the appropriate remaining control lines (NCS line 28, NCE line 30, or NRW line 32) in order to trigger the acceptance of the command by memory 26.

Once the command has been accepted, the method proceeds with step 70 wherein the CLE line 34, one or more I/O lines, and the control lines are deasserted by memory interface 24.

Because a command cycle is most often followed by an address cycle and a data cycle, the method of the present invention will most often proceed from the completion of step 70 to return to step 66. If, however, no further processing is required in order to complete the operation requested by CPU 10, the method of the present invention may terminate at the completion of step 70.

Following the issuance of a valid read or write command in a command cycle, it is often necessary to issue an address that is related to the command just issued. This determination is made at step 72.

If, at step 72, it is determined that an address cycle is necessary, the method proceeds to step 74 during which memory interface 24 asserts the ALE line and other appropriate control lines. Memory interface 24 also transmits the address to memory 26 in three data segments of eight bits each. Other sizes of memory 24 such as 512 Kbytes, or 128 Mbytes might require less or more data segments. The use of a number of data segments other than three is contemplated by the inventors and believed to be within the scope and purpose of the present invention.

At step 76, after the address is transmitted to memory 26, the ALE line, the control lines, and the I/O lines are all deasserted. At this point, it is nearly certain that a data cycle is required.

If a data cycle is required, the method proceeds at step 78 when the proper control lines are asserted, and the proper data lines are asserted. In the case of a read operation, the data lines and certain control lines are asserted by memory 26. The asserted control lines signify that data is available to be read by memory interface 24.

At step 80, it is determined whether the transfer of the desired page of memory has completed. If not, the method proceeds at step 78 where the appropriate control lines are asserted and deasserted so that the next piece of data will be indicated on I/O lines 38. However, if the entire page of memory has been transferred, all control lines and all I/O lines are deasserted at step 82.

If, at step 62, the CPU required an operation involving memory 12, the method of the present invention proceeds to step 84 where all CPU control signals, data signals, and address signals are passed through memory interface to memory 12 so that the desired operation may be performed with the minimum number of delays.

When practicing either the embodiment of FIG. 2 or the embodiment of FIG. 3, it is preferred that software control the data reads and writes associated with memory 26. Alternatively, memory interface may contain the necessary logic and enough random access memory (RAM) to perform the block commands without external support. Using this approach would require a minimum of a page of RAM memory (512 bytes if using the preferred memory component) and a programmed logic device.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

We claim:

1. A processor to NAND flash memory interface comprising:

a processor also having a plurality of control lines, a plurality of address lines, and a plurality of data lines;

a NAND flash memory unit also having a plurality of control lines and a plurality of I/O lines;

a memory interface unit also having a first and second plurality of control lines, a plurality of address lines, a plurality of data lines, and a plurality of I/O lines where said plurality of processor control lines are operably coupled to said first plurality of control lines, said plurality of processor address lines are operably coupled to said plurality of address lines, said plurality of processor data lines are operably coupled to said plurality of data lines, said plurality of NAND flash memory control lines are operably coupled to said second plurality of control lines, said plurality of NAND flash memory I/O lines are operably coupled to said plurality of I/O lines;

said memory interface configured to receive addresses from said processor in said processor's native address form, configure said processor's native address form to said NAND flash memory's native address form, send said NAND flash memory's native address form to said NAND flash memory, receive data from a location associated with said NAND flash memory's native form address from said NAND flash memory, extract at least one byte of data from said data received from said NAND flash memory where said at least one byte of data is associated with said processor's native address form, and send said extracted data to said processor in said processor's native data form; and, said memory interface further configured to be responsive to said processor before said processor is in operable communication with any component not addressable by said processor using said processor's native commands.

2. The device of claim 1 wherein said a memory interface unit further comprises a programmable logic device.

3. The device of claim 1 wherein said a memory interface unit further comprises an application specific integrated circuit.

4. A processor to NAND flash memory interface comprising:
   a processor also having a plurality of control lines, a plurality of address lines, and a plurality of data lines;
   a NAND flash memory unit also having a plurality of control lines and a plurality of I/O lines;
   a second memory unit also having a plurality of control lines, a plurality of address lines, and a plurality of data lines;
   a memory interface unit also having a first, second, and third plurality of control lines, a first and second plurality of address lines, and a first and second plurality of data lines, and a plurality of I/O lines where said plurality of processor control lines are directly coupled to said first plurality of control lines, said plurality of processor address lines are directly coupled to said first plurality of address lines, said plurality of processor data lines are directly coupled to said first plurality of data lines, said plurality of NAND flash memory control lines are directly coupled to said second plurality of control lines, said NAND flash memory I/O lines are directly coupled to said plurality of I/O lines, said plurality of second memory control lines are directly coupled to said third plurality of control lines, said second memory address lines are directly coupled to said second plurality of address lines, said second memory data lines and directly coupled to said second plurality of data lines;
   said memory interface configured to receive addresses from said processor in said processor's native address form, configure said processor's native address form to said NAND flash memory's native address form, send said NAND flash memory's native address form to said NAND flash memory, receive data from a location associated with said NAND flash memory's native form address from said NAND flash memory, extract at least one byte of data from said data received from said NAND flash memory where said at least one byte of data is associated with said processor's native address form, and send said extracted data to said processor in said processor's native data form; and,
   said memory interface further configured to be responsive to said processor before said processor is in operable communication with any component not addressable by said processor using said processor's native commands.

5. The device of claim 4 wherein said second memory further comprises read only memory.

6. The device of claim 4 wherein said second memory further comprises an EEPROM.

7. The device of claim 4 wherein said second memory further comprises random access memory.

8. The device of claim 4 wherein said second memory further comprises synchronous dynamic random access memory.

9. A method for completing data transfers between a processor having control lines, address lines, and data lines, a memory interface having first and second control lines, address lines, data lines, and I/O lines where the processor's control lines, address lines, and data lines are operatively connected to the memory interface's first control lines, address lines, and data lines, a NAND flash memory having control lines and I/O lines where the NAND flash memory's control lines are operatively connected to the memory interface's second control lines and the NAND flash memory's I/O lines are operatively coupled the memory interface's I/O lines, and where the memory interface is further configured to be responsive to the processor's and the NAND flash memory's native commands, and be responsive to the processor before the processor is in operable communication with any component not addressable by the processor using the processor's native commands, the method comprising:
   causing said processor to send a signal on at least one of said control lines;
   causing said processor to send a signal on at least one of said address lines;
   causing said processor to accept data on at least one of said data lines if said control signal contains a "read" signal;
   causing said processor to send data on at least one of said data lines if said control signal contains a "write" signal;
   causing said memory interface to receive said processor's control line signal on one of said memory interface's first control lines;
   causing said memory interface to receive said processor's address line signal on one of said memory interface's first address lines;
   causing said memory interface to functionally respond to said processor's at least one data line;
   causing said memory interface to initiate a command sequence to said NAND memory using said second control lines and said I/O lines;
   causing said NAND memory to receive said control and I/O signals on said NAND memory's control and I/O lines and functionally respond using data on said I/O lines;
   causing data to be transferred thereby between said memory interface, said NAND memory, and said processor.

10. A method for completing data transfers between a processor having control lines, address lines, and data lines, a memory interface having first and second control lines, address lines, data lines, and I/O lines where the processor's control lines, address lines, and data lines are operatively connected to the memory interface's first control lines, address lines, and data lines, a NAND memory having control lines and I/O lines where the NAND memory's control lines are operatively connected to the memory interface's second control lines and the NAND memory's I/O lines are operatively coupled the memory interface's I/O lines, where the memory interface is further configured to be responsive to the processor's and the NAND flash memory's native commands, and be responsive to the processor before the processor is in operable communication with any component not addressable by the processor using the processor's native commands, the method comprising:
   sending control, address, and data signals from said processor on said processor control, address, and data lines;
   receiving said control, address, and data signals into said memory interface on said memory interface's first control lines and address and data lines;

configuring said received data for NAND memory if said data is to be sent to said NAND memory;

sending NAND memory command signals on said second control lines and on said I/O lines if said signals are command signals;

sending NAND memory address signals on said second control lines and on said I/O lines if said signals are address signals;

sending NAND memory data signals on said second control lines and on said I/O lines if said signals are data signals;

receiving NAND memory command signals into said NAND memory on said NAND memory control lines and I/O lines if said signals are command signals;

receiving NAND memory address signals into said NAND memory on said NAND memory control lines and I/O lines if said signals are address signals;

receiving NAND memory data signals into said NAND memory on said NAND memory control lines and I/O lines if said signals are data-in signals;

sending data from said NAND memory on said NAND memory control and I/O lines if said control signals are data-out signals; receiving data into said memory interface from said NAND memory if said NAND memory is sending data on said control and I/O lines; configuring said data received in said memory interface for said processor;

sending said reconfigured data to said processor on said memory interface data lines;

completing data transfers between said processor, NAND memory, and memory interface.

11. A method as in claim 10 further including the step of:

quiescing said memory interface if said processor control, address, and data lines are also directly connected to a conventional non-volatile memory and if said conventional non-volatile memory is being addressed by control, address, and data signals sent from said processor on said processor control, address, and data lines.

12. A method as in claim 10 further including the step of:

passing signals directly through said memory interface if said memory interface further comprises additional control, address and data lines where said additional control, address and data lines are directly coupled to conventional non-volatile memory and where said address lines are addressing said conventional non-volatile memory.

13. A method as in claim 12 further including the step of:

initializing a memory map in said processor in preparation for sending signals on said control, address and data lines.

14. A method as in claim 10 further including the step of:

quiescing said memory interface if said processor control, address, and data lines are also directly connected to a conventional memory and if said conventional memory is being addressed by control, address, and data signals sent from said processor on said processor control, address, and data lines.

15. A method as in claim 14 further including the step of:

initializing a memory map in said processor in preparation for sending signals on said control, address and data lines.

16. A method as in claim 10 further including the step of:

passing signals directly through said memory interface if said memory interface further comprises additional control, address and data lines where said additional control, address and data lines are directly coupled to conventional memory and where said address lines are addressing said conventional memory.

17. A method as in claim 16 further including the step of:

initializing a memory map in said processor in preparation for sending signals on said control, address and data lines.

18. A method as in claim 10 further including the step of:

initializing a memory map in said processor in preparation for sending signals on said control, address and data lines.

19. A method as in claim 11 further including the step of:

initializing a memory map in said processor in preparation for sending signals on said control, address and data lines.

* * * * *